Sept. 21, 1943.     H. S. PONZER     2,329,940

MANUFACTURE OF CEMENT

Filed Dec. 12, 1940

INVENTOR
HOWARD S. PONZER
PER
ATTORNEYS

Patented Sept. 21, 1943

2,329,940

UNITED STATES PATENT OFFICE 2,329,940

MANUFACTURE OF CEMENT

Howard S. Ponzer, St. Louis, Mo., assignor to Missouri Portland Cement Co., St. Louis, Mo., a corporation of Missouri Application December 12, 1940, Serial No. 369,797

13 Claims. (Cl. 106—100)

This invention relates, generally, to the manufacture of Portland cement in wet process plants and particularly to a process of conditioning dust recovered from the stack gases of rotary kilns for use as an ingredient of raw cement slurry.

In the manufacture of Portland cement, substantial quantities of dust are carried out of the rotary kilns by the waste gases; and it has become common practice for such dust to be removed before the gases are released to the atmosphere.

The dust collected from the waste gases from a rotary cement kiln consists of a mixture of partially burned material having some hydraulic properties, ash from the fuel, and dry raw materials. Generally the dust is not at any time of the proper composition for cement making. Also, because of irregularities of kiln operation, the proportions of the various constituents vary continually, with the result that without correction, the dust is totally unsuitable for cement making.

Dust collected from the waste gases of the rotary kilns generally has sufficient hydraulic qualities that, when mixed alone with water, it will set and harden within one to two days. However, the hydraulic qualities of the dust offer no obstacle to its use as an ingredient of cement slurry, regardless of the quantity added, provided the elapsed time after mixing the dust with water is not sufficient to permit setting and hardening to take place. Also where the dust is systematically returned to the system in the form of a small addition to the regular cement slurry, the low concentration of the dust prevents the tendency to set and harden. Accordingly, the present invention is not concerned with the control of the tendency of slurries made from dust collected from the waste gases to set and harden.

In cases where the raw cement mix contains clay particles, the introduction of relatively small quantities of dust collected from the waste cement kiln gases is observed to have the disadvantageous effect of substantially increasing the viscosity of the slurry. Such increases in viscosity take place immediately (as distinguished from the time period of about one to two days required for the dust slurry to set and harden), and thus results in rendering the raw cement slurry extremely difficult and in some cases impossible to handle in the customary manner. The addition to a raw cement slurry containing clay particles of about 3% of dust collected from the waste cement kiln gases will increase the viscosity of the slurry to an extent such that it cannot be handled in the usual manner, although the slurry does not set and harden.

The object of the present invention, generally stated, is to provide a process of treating dust collected from waste cement kiln gases so as to inhibit the tendency of such dust to appreciably increase the viscosity of raw cement slurry when mixed therewith.

Other objects of the invention will become apparent to those skilled in the art when the following description is read in connection with the accompanying drawing, in which.

In accordance with the present invention, generally stated, dust as recovered from the waste kiln gases is treated so as to inhibit the normal tendency of such material, when mixed with raw cement slurry containing clay particles, to increase the viscosity of the slurry. Such increase in viscosity of a raw cement slurry containing clay particles is attributable, it may be postulated, to the action of ions present in the dust slurry, which tend to flocculate the clay particles present in the raw cement slurry, and hence increase the viscosity of the slurry. It is possible, also, that certain ions may be present which affect the colloidal activity or gel strength of the clay particles or other colloidal matter present in the slurry, with the result that an increase of viscosity occurs immediately upon introduction of the dust slurry, unless the dust has been treated in a manner such as to inhibit the tendencies just referred to.

In accordance with the present invention, therefore, the dust is treated with a weak acid, such for example as by making a slurry of the dust and aerating it with a gas rich in carbon dioxide, waste rotary kiln gas being suitable for use in this connection. The treatment of the dust with a weak acid in this manner accomplishes definite changes in the chemical composition of the dust in the slurry, thereby adjusting the pH value downward to approximately 8. The extent of treatment will, of course, in any case depend upon the composition of dust; and consequently the extent of treatment with carbon dioxide, or other weak acid, may be varied so as to achieve a condition at which the normal tendency of the dust slurry to flocculate the clay particles of the raw cement slurry is overcome.

Treatment of the dust slurry with carbon dioxide gas, or with waste kiln gases containing substantial quantities of carbon dioxide gas, results in the conversion of the appreciable quantities of hydroxides present to carbonates. Other beneficial reactions also appear to take place between other constituents of the treating gas and the various components of the dust slurry. One such reaction is the conversion of alkali sulfides.

Figure 1:
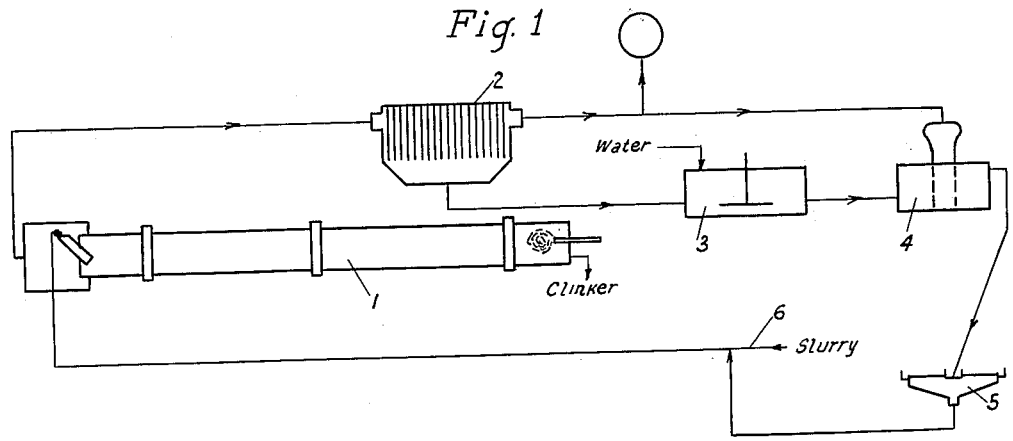
Figure 1 is a flow sheet, illustrating diagrammatically some of the operations in cement manufacture and including the various stages of handling dust collected from waste cement kiln gases in accordance with the present invention.

In accordance with one embodiment of the present invention, referring for illustration to Figure 1 of the drawing, the raw cement slurry is introduced at the left end of kiln 1, which is fired in the usual manner by the introduction of heating gases at the right end thereof, so that the raw materials travel in counter-current relation to the heating gases through kiln 1, and the resultant clinker is discharged at the right end of kiln 1. The gases escaping from the left end of kiln 1 are caused to pass through a suitable dust collecting device, such for example as the well-known Cottrell precipitator. In the Cottrell precipitator 2, the bulk of the entrained dust is removed from the waste gases.

From the dust collector 2 the dust is conveyed to the slurry mixer 3 in which the dust is incorporated with about 3 times its weight of water. The slurry produced in mixer 3 is then conducted to an aerating apparatus 4, to be more fully described hereinafter. In the aerating apparatus 4 the waste gases from the dust collector 2, containing, for example, 15% to 20% of carbon dioxide, are percolated through and agitated with the dust slurry to an extent, and for a time sufficient, to accomplish the desired chemical reactions and hence produce the desired adjustment in pH value. From aerator 4, the reacted slurry may be passed through a thickening apparatus such as a thickener 5, in which the excess water is removed from the slurry, carrying with it such soluble salts as may have become dissolved therein. The thickened dust slurry is then introduced into the main raw cement slurry stream 6, either during the grinding operation or subsequently during slurry blending or storing. Following introduction of the treated dust slurry, the raw cement slurry is handled in accordance with the usual practice; and at the appropriate time is delivered to kiln 1.

Figure 2:
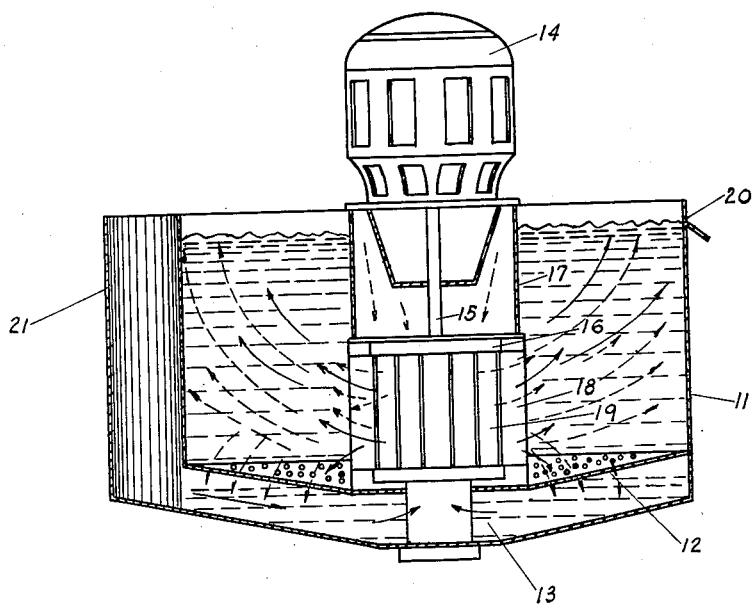
Figure 2 is a sectional view of an apparatus employed in accordance with one embodiment of the invention, for treating the dust after it has been mixed with water to form a dilute slurry.

The aerator 4 may be of any suitable type adapted to accomplish thorough distribution of the carbon dioxide in the dust slurry. Where stack gases are employed as the source of carbon dioxide, care should be exercised to avoid conditions at which such stack gases are subjected to relatively high pressures, and accordingly in the process of the present invention, where waste gases are employed as the source of carbon dioxide, it is especially important to provide an aerating apparatus of the character such that the carbon dioxide laden gas may be dispersed and distributed through the fluid without at any time subjecting the gas to undesirable pressures. In order to accomplish such treatment of the dust slurry, a flotation cell of a character well known to those skilled in the art of flotation concentration of minerals may be employed as the aerator. One embodiment of such a device is illustrated in Figure 2 of the drawing, and comprises a tank 11 having a perforated false bottom 12. Mounted centrally of tank 11 is an agitating mechanism arranged to produce violent agitation of the slurry in tank 11, and concurrently to introduce a substantial quantity of gas into the slurry in the form of well-dispersed, finely divided bubbles. The agitating mechanism, as shown in the drawing, consists of a high speed electric motor 14, having a depending shaft 15 provided at its lower end with a rotor 16. Surrounding shaft 15 is a partition 17 extending downwardly to the region of rotor 16; and extending about rotor 16 is a series of stationary vanes 18, arranged to cooperate with vanes of rotor 16.

A discharge gate 20 is provided in one wall of tank 11, and an inlet pipe 21 is provided for introducing the slurry to chamber 13.

In the operation of the aerating cell just described, the slurry to be treated is introduced through pipe 21, filling chamber 13, and is drawn upwardly through the center of the agitator, and projected outwardly, as shown by the full line arrows. The centrifugal action of the agitator is such as to tend to evacuate the space within partition 17, and accordingly the gases which are to be dispersed in the slurry are drawn downwardly, as shown by the broken line arrows, and projected outwardly in fine distribution, without at any time being subjected to pressures of such magnitude as to be dangerous.

While in Figure 1 of the drawing but one stage of aeration is illustrated, it will be readily understood that when the desired degree of treatment is not accomplished in one stage of aeration, a plurality of such aerating devices 4 may be arranged in series, or in parallel for batch operation.

When the dust slurry has been treated to the desired extent, so as to accomplish the desired chemical reactions, and hence appropriate adjustment of pH value, the slurry may be passed through the thickener 5, as hereinbefore described, in order to remove the excess water and soluble alkalis, and by so doing, produce a slurry of normal water content. A further elaboration of the thickening device for the purpose of additional alkali extraction would consist of a multiple stage, counter-current thickening device.

The proportion in which the treated dust slurry may be incorporated with the raw cement slurry will vary in accordance with the composition of the dust slurry and the composition of the raw cement slurry. In one typical instance, where the raw cement slurry consisted of one part of shale (primarily compressed clays) and six parts of relatively pure limestone, with sufficient water to bring the moisture content to 38%, a treated dust slurry was incorporated in the raw cement slurry, in such a proportion that the dry solids of the treated dust slurry represented 3% of the total dry solid weight, without encountering the disadvantageous increase in viscosity hereinbefore referred to. In the instance mentioned, the dust slurry was composed (as recovered) substantially as follows:

| | Per cent |
|---|---|
| $SiO_2$ | 24.94 |
| $Fe_2O_3$ | 4.42 |
| $Al_2O_3$ | 8.10 |
| $CaO$ | 43.02 |
| $MgO$ | 1.90 |
| $SO_3$ | 1.97 |
| Sulfide sulfur | 0.38 |
| Loss on ignition | 9.64 |
| Alaklis (expressed as $Na_2O$) | 5.19 |
| Total | 99.56 |

Such dust was formed into a slurry with 3 parts of water to each part of dust and the dust slurry then treated with nine cubic feet of waste gas (containing 12% $CO_2$) per pound of dust.

Upon incorporation of the treated dust slurry with the raw cement slurry, the resultant slurry was handled in accordance with the conventional practice, without encountering handling difficulties, and without deleterious effect upon the resultant product.

Obviously, when the composition of the treated dust slurry (which is being reintroduced into the regular raw mix stream) varies, appropriate adjustment must be made in the proportions of the constituents making up the regular raw cement slurry. Those skilled in the art will readily understand that, regardless of the composition of the treated dust slurry, the proportions of the various ingredients of the final mixture must be so controlled that when the slurry is finally delivered to the kiln it must conform to the standards of practice for the particular plant.

While for the purpose of facilitating the disclosure herein, the invention has been described with particular reference to the treatment of dust collected in the well known Cottrell precipitator, it is to be distinctly understood that the invention is not limited to the treatment of Cottrell precipitator dust, but that it is applicable at large to the treatment of dust collected in any manner from the waste gases of rotary cement kilns. Accordingly, the references herein to the Cottrell precipitator as an illustrative type of dust collector, and to Cottrell precipitator dust, are for the purpose of illustration only, and not by way of limitation.

With the foregoing description, it is believed that those skilled in the art will understand that the present invention accomplishes its objects, and provides a mode of treatment of dust collected from waste kiln gases whereby the same may be conveniently, economically, and advantageously employed as an ingredient of cement slurry, without encountering increases in viscosity which heretofore have been experienced.

While in the foregoing description a full disclosure has been given of one embodiment of the present invention, it is apparent that many modifications, adjustments and variations will present themselves to those skilled in the art, without departing from the spirit of the invention; and it is therefore to be distinctly understood that such modifications, adjustments, adaptations and variations as do not depart from the spirit of the invention are, although not specifically described herein, contemplated by and within the scope of the appended claims.

Having thus described the invention, what is claimed is:

1. In the manufacture of Portland cement, in which the waste kiln gases are passed through a dust collector, the process comprising, removing the dust from the collector, treating the dust with water and carbon dioxide, and without permitting the dust to set, incorporating the treated dust with a raw cement slurry.

2. In the manufacture of Portland cement, in which the waste kiln gases are passed through a dust collecting device, the process comprising, removing dust from the collector, making a slurry of the dust, injecting carbon dioxide beneath the surface of the slurry, and without permitting the slurry to harden, mixing the treated slurry with a raw cement slurry.

3. In the manufacture of Portland cement, in which the waste kiln gases are passed through a dust collecting device, the process comprising, removing dust from the dust collector, making a slurry of the dust, injecting carbon dioxide beneath the surface of the slurry, leaching out water soluble constituents of the dust slurry, and mixing the treated slurry with a raw cement slurry.

4. In the manufacture of Portland cement, wherein the raw cement mix contains clay particles and in which dust is recovered from the waste kiln gases, the process comprising, forming a slurry of the recovered dust, treating the dust slurry with carbon dioxide, and, without permitting the slurry to harden, admixing the treated dust slurry with raw cement slurry containing clay particles.

5. In the manufacture of Portland cement, wherein the raw cement mix contains clay particles, and in which the dust is recovered from the waste kiln gases, the process comprising, forming a slurry of the recovered dust, treating the dust slurry with carbon dioxide to an extent sufficient to reduce the pH value of the slurry to approximately 8, and, without permitting the slurry to harden, admixing the treated dust slurry with the raw cement slurry.

6. In the manufacture of Portland cement, wherein the raw cement mix contains clay particles, and in which dust is recovered from the waste kiln gases, the process comprising, forming a slurry of the recovered dust, treating the dust slurry with carbon dioxide, and admixing the treated dust slurry with the raw cement slurry.

7. In the manufacture of Portland cement, wherein the raw cement mix contains clay particles, and in which dust is recovered from the waste kiln gases, the process comprising, forming a slurry of the recovered dust, injecting carbon dioxide beneath the surface of the dust slurry, and admixing the resultant slurry with raw cement slurry.

8. In the manufacture of Portland cement, wherein the raw cement mix contains clay particles, and in which dust is recovered from the waste kiln gases, the process comprising, forming a slurry of the recovered dust, injecting kiln gases containing carbon dioxide below the surface of the slurry, and admixing the resultant slurry with raw cement slurry.

9. In the manufacture of Portland cement, wherein the raw cement mix contains clay particles, and in which dust is recovered from the waste kiln gases, the process comprising, forming a slurry of the recovered dust, injecting waste kiln gases containing carbon dioxide below the surface of the slurry without subjecting the kiln gases to substantial pressure, and admixing the resultant slurry with raw cement slurry.

10. In the manufacture of Portland cement, wherein the raw cement mix contains clay particles, and in which dust is recovered from the waste kiln gases, the process comprising, forming a slurry of the recovered dust, aerating the dust slurry with waste kiln gases containing carbon dioxide, conducting waste kiln gases into and distributing the same substantially beneath the surface of a batch of the dust slurry, all without subjecting the kiln gases to substantial pressure; and admixing the resultant slurry with raw cement slurry.

11. In the manufacture of Portland cement, wherein the raw cement mix contains clay particles and in which dust is recovered from waste kiln gases, the process comprising, forming a slurry of the recovered dust, injecting carbon dioxide into and distributing the same throughout the body of the slurry, reacting the dust slurry with carbon dioxide to an extent sufficient to carbonate the hydroxides and convert alkali sulfides, and, without permitting the slurry to harden, admixing the reacted slurry with raw cement slurry.

12. In the manufacture of Portland cement, wherein the raw cement mix contains clay particles, and in which dust is recovered from waste kiln gases, the process comprising, forming a slurry of the recovered dust, injecting carbon dioxide into and distributing the same throughout the body of the slurry, reacting the dust slurry with carbon dioxide to an extent sufficient to carbonate the hydroxides and convert alkali sulfides, removing some of the water with dissolved compounds from the slurry to thicken the same, and immediately admixing the thickened slurry with raw cement slurry.

13. In the manufacture of Portland cement, wherein the raw cement mix contains clay particles, and in which dust is recovered from the waste kiln gases, the process comprising, forming a water slurry with the dust, injecting carbon dioxide into and distributing the same throughout the body of the slurry carbonating the slurry, removing water with dissolved salts from the slurry, and immediately admixing the slurry with raw cement slurry.

HOWARD S. PONZER.

CERTIFICATE OF CORRECTION.

Patent No. 2,329,940. September 21, 1943.

HOWARD S. PONZER.

It is hereby certified that error appears in the printed specification of the above numbered patent requiring correction as follows: Page 4, second column, line 12, claim 13, strike out "carbonating the slurry"; and that the said Letters Patent should be read with this correction therein that the same may conform to the record of the case in the Patent Office.

Signed and sealed this 14th day of December, A. D. 1943.

(Seal)

Henry Van Arsdale,
Acting Commissioner of Patents.